United States Patent
Barrios et al.

(10) Patent No.: US 9,809,684 B2
(45) Date of Patent: Nov. 7, 2017

(54) RESIN EMULSION COMPOSITION, AND PROCESS OF OBTAINING SAME

(71) Applicant: OXITENO S.A. INDÚSTRIA E COMÉRCIO, São Paulo (BR)

(72) Inventors: Silmar Balsamo Barrios, Santo André (BR); Juliane Pereira Santos, Santo André (BR); Pedro Henrique Invencione Porto, Santo André (BR); Fernanda de Oliveira Barreto Costa, Jd Sta Emília (BR); Priscila Milani De Paula, São Paulo (BR); Paulo de Jesus Cunha Filho, São Paulo (BR); Renan Marcel Urenhiuki, São Paulo (BR); Nádia Andrade Armelin, Cambuci (BR); Servaas Engels, Itú (BR)

(73) Assignee: OXITENO S.A. INDUSTRIA E COMERCIO, Sao Paulo (BR)

(*) Notice: Subject to any disclaimer, the term of this patent is extended or adjusted under 35 U.S.C. 154(b) by 0 days.

(21) Appl. No.: 15/302,295

(22) PCT Filed: Mar. 25, 2015

(86) PCT No.: PCT/BR2015/050032
§ 371 (c)(1),
(2) Date: Oct. 6, 2016

(87) PCT Pub. No.: WO2015/154157
PCT Pub. Date: Oct. 15, 2015

(65) Prior Publication Data
US 2017/0029573 A1    Feb. 2, 2017

(30) Foreign Application Priority Data
Apr. 8, 2014 (BR) .............. 102014008480

(51) Int. Cl.
C09D 167/00 (2006.01)
C08J 3/05 (2006.01)
C08K 5/42 (2006.01)
C09D 7/12 (2006.01)
C09D 167/08 (2006.01)
C09D 171/02 (2006.01)
C08G 65/08 (2006.01)

(52) U.S. Cl.
CPC ..... *C08J 3/05* (2013.01); *C08K 5/42* (2013.01); *C09D 7/125* (2013.01); *C09D 7/1233* (2013.01); *C09D 167/08* (2013.01); *C08G 65/08* (2013.01); *C08J 2367/08* (2013.01); *C09D 171/02* (2013.01)

(58) Field of Classification Search
None
See application file for complete search history.

(56) References Cited

U.S. PATENT DOCUMENTS

| | | | |
|---|---|---|---|
| 7,241,813 B2* | 7/2007 | Kay | ............ C08G 65/32 424/400 |
| 2003/0021999 A1 | 1/2003 | Paar et al. | |
| 2003/0144397 A1 | 7/2003 | Bouvy et al. | |
| 2007/0299228 A1 | 12/2007 | McNamee et al. | |
| 2013/0244173 A1 | 9/2013 | Qiu et al. | |

FOREIGN PATENT DOCUMENTS

| | | |
|---|---|---|
| CN | 103232801 A | 8/2013 |
| EP | 0593487 B1 | 11/1991 |
| EP | 0649867 A1 | 4/1995 |
| EP | 1290064 B1 | 5/2001 |
| JP | S5761049 A | 4/1982 |
| JP | S61136556 A | 6/1986 |
| JP | H01201355 A | 8/1989 |
| JP | H05311000 A | 11/1993 |
| JP | H07138490 A | 5/1995 |
| JP | 2004-189912 A | 7/2004 |
| JP | 2008-151889 A | 7/2008 |
| JP | 2009-175172 A | 8/2009 |
| KR | 860001005 B1 | 7/1986 |
| NO | 2015/154157 A1 | 10/2015 |
| RU | 2154082 C1 | 8/2000 |
| WO | 2006/109432 A1 | 10/2006 |
| WO | 2011/051612 A1 | 5/2011 |
| WO | 2013/056162 A1 | 4/2013 |

* cited by examiner

*Primary Examiner* — Richard A Huhn
(74) *Attorney, Agent, or Firm* — Jeffrey N. Townes; LeClairRyan

(57) ABSTRACT

The present invention relates to aqueous resin emulsions containing at least a non-ionic surfactant of general formula $R_1\text{-}(A_1O)_n\text{-}(A_2O)_x\text{-}(A_3O)_y\text{-}R_2$, obtained by the phase inversion emulsification process. In particular, the invention relates to aqueous resin emulsions commonly used in solvent-based paints, such as, for example, alkyd resins. Said emulsions are stabilized by non-ionic and anionic surfactant compositions which promote the inversion of the water-oil to oil-water phases in the presence of low water content, enabling water-oil type emulsions to be obtained with high productivity and high solids content, even in low shear conditions.

20 Claims, No Drawings

RESIN EMULSION COMPOSITION, AND PROCESS OF OBTAINING SAME

CROSS-REFERENCE TO RELATED APPLICATIONS

This application is a 371 National Stage application of International PCT Application PCT/BR2015/050032, filed Mar. 25, 2015, which claims priority to Brazilian Application No. BR102014008480-0, filed Apr. 8, 2014, both of which are incorporated herein by reference in their entirety.

FIELD OF THE INVENTION

The present invention relates to aqueous resin emulsions containing at least a non-ionic surfactant of general formula $R_1\text{-}(A_1O)_{11}\text{-}(A_2O)_x\text{-}(A_3O)_y\text{—}R_2$, obtained by phase inversion emulsification process. In particular, the invention relates to aqueous resin emulsions commonly used in solvent-based paints, such as, for example, alkyd resins. Said emulsions are stabilized by non-ionic and anionic surfactant compositions which promote the inversion of the water-oil to oil-water phases in the presence of low water content, enabling water-oil type emulsions to be obtained with high productivity and high solids content, even in low shear conditions.

STATE OF THE ART

The development of water-base coating technologies has long been the focus of research areas. The first coatings which excluded the use of organic solvents from the composition arose in the mid-twentieth century. Today, most architectural coatings use water-based technology based on acrylic/vinyl resins obtained through polymerization in emulsion.

However, for specific applications, as in high gloss enamel, the use of acrylic emulsion technology is not enough to attain the performance obtained by consolidated solvent-based technologies which still dominate the market.

The emulsification of insoluble polymers in water has been the solution found to achieve the performance required for this type of coating, as described in references US2003144397, US2003021999, US2002211575, US2007299228, US2013244173, WO2011051612, WO2006109432, WO2013056162 and EP0593487.

The emulsification process commonly employed involves the use of the phase inversion technique, which consists of the gradual addition of water to the polymer to be emulsified. At the start, when the concentration of water is below a critical value, the emulsion is of the water-in-oil type. The productivity of the process depends on this stage, because at this time the addition of water should be slow. When a critical value of water concentration is achieved, the phase inversion occurs (inversion point), where the emulsion becomes oil-in-water type. After this point, the emulsion is compatible with water and final characteristics such as particle size are already achieved. From this point onwards, the addition of water can be rapid.

Problems Related to the State of the Art

Emulsification processes described in the state of the art to-date do not cite how to obtain polymer emulsions with high solid content at the inversion point. Emulsions with high solid content are understood to be emulsions in which the mass fraction of the polymer emulsified in water is greater than 60% in relation to the total emulsion.

Additionally, the manufacture of emulsions with the greatest possible efficiency, that is, processes and formulations to obtain the smallest particle size with the minimum amount of surfactant and using the least possible energy in the least possible time, has been little exploited.

All the emulsification processes described in the references mentioned previously use non-conventional specific equipment (e.g.: Intermig, static mixers) to generate alkyd emulsions with size particles less than 500 nm in low shear conditions.

Accordingly, there is a lack of compositions of effective surfactants to reduce size, stabilize particles and promote the inversion of resin phases in the presence of low contents of surfactants and water in mild shear conditions using conventional equipment.

DETAILED DESCRIPTION OF THE INVENTION

The present invention relates to aqueous resin emulsions containing compositions of optimized non-ionic and anionic surfactants to generate stable emulsions with reduced droplet or particulate sizes, high solids and high process productivity, even under mild shear conditions, conventional stirring equipment and low overall concentration of surfactants by way of the phase inversion emulsification method.

The aqueous resin emulsions comprised in the present invention contain at least a resin, water and at least a non-ionic surfactant of formula I:

$$R_1\text{-}(A_1O)_n\text{-}(A_2O)_x\text{-}(A_3O)_y\text{—}R_2 \qquad (I)$$

wherein
$R_1$ is a saturated or unsaturated carbon chain containing 1-22 carbons
$A_1O$ is an alkylene oxide homopolymer or block or random copolymer
$A_2O$ is an alkylene oxide block or random copolymer having a composition different to $A_1$ and $A_3$
$A_3O$ is an alkylene oxide homopolymer or block or random copolymer
x varies from 1 to 30
n varies from 1 to 100
y varies from 0 to 100
$R_2$ is hydrogen or a saturated or unsaturated carbon chain containing 1-22 carbons In a preferred embodiment of the resin emulsion composition according to the present invention, the emulsions obtained present an organic phase content from 30 to 90%, preferably between 60-80%.

In a preferred embodiment of the resin emulsion composition according to the present invention, appropriate resins for emulsification include all types of suitable polymers that are commonly used in coatings, for example, paints and adhesives, being obtained by polymerization methods known in the art. Said polymers include, but not limited to, acrylic, vinyl, epoxy, cellulose and polyester resins and derivatives thereof. Especially, the present invention is suitable for the emulsification of alkyd resins and derivatives thereof, both for air or forced drying, with oil lengths in the range of 10 to 100%, preferably 30 to 80% and especially 45 to 55%.

In a preferred embodiment of the resin emulsion composition according to the present invention, the resins or polymers used may comprise a single resin or mixture of two or more resins.

In a preferred embodiment of the resin emulsion composition according to the present invention, it is possible to use solvent-free resins, resins containing low residual solvent content or resins in solution by using a suitable solvent. Said solvents include, but are not limited to, aromatic and aliphatic compounds, esters, alcohols, glycols and derivatives thereof. Preferably, the solvents used comprise the family of petroleum naphthas, especially turpentine.

In a preferred embodiment, the resin emulsion composition according to the present invention is characterized wherein the non-ionic surfactants comprise only the non-ionic surfactant of formula I.

In a preferred embodiment, the resin emulsion composition according to the present invention is characterized wherein the non-ionic surfactants are mixtures of a surfactant of formula I and convention alkoxylate surfactants containing at least 10% of the surfactant of formula I.

Notably, it is desirable to use combinations of non-ionic surfactants of formula (I) with anionic surfactants, such as alkyl ether carboxylates, alkyl aryl sulfonates, phosphate esters, alkyl ether sulfates, semi or diester of sulfosuccinates, sulfated or sulfonated oils, such as castor oil, or sulfonated fat, alkyl or alkylene sulfates, or a mixture of at least two of such anionic surfactants. These well-known classes of anionic surfactants are furnished as acidulates, or include counter-ions to render them nearer neutral. In this invention, it is possible to use neutralized anionic surfactants or to include neutralizing agents in the compositions. Suitable counter-ions include those derived from alkaline metals, especially from sodium and potassium (adequately furnished as hydroxide or carbonate) and, especially for sodium and potassium (adequately furnished as hydroxide or carbonate) and, especially ether carboxylates, amines, especially tertiary amines, including hydroxyalkyl amines, especially alkanolamines. Neutralization at the point of use or in situ during emulsification can be performed by using a suitable base such as a hydroxide or alkaline metal carbonate or amines, especially alkanolamines. The amount of neutralizing agent used is sufficient to achieve a desired pH level in the product emulsion. Preferably, the pH of the end emulsion is within the range of 3 to 10, more preferably, 5 to 9. Therefore, another preferred embodiment of the resin emulsion composition according to the present invention, comprises the use of at least an anionic surfactant.

In a preferred embodiment of the resin emulsion composition according to the present invention, the surfactants employed in the emulsification of resins by the phase inversion method are mixtures of non-ionic and anionic surfactants.

In a preferred embodiment of the resin emulsion composition according to the present invention, the anionic surfactants may be derived from alkyl ether carboxylates, alkyl aryl sulfonates, alkyl sulfonates, alkyl ether sulfates, phosphate esters, semi or diester of sulfosuccinates, sulfated or sulfonated oils, such as castor oil, or sulfonated fat, alkyl or alkylene sulfates, neutralized with alkaline metal bases, especially sodium and potassium, and amines, especially tertiary amines, including hydroxyalkyl amines, especially alkanolamines.

In a preferred embodiment of the resin emulsion composition according to the present invention, the ratio of non-ionic/anionic surfactants varies between 5 and 95%, preferably the ratio of non-ionic/anionic surfactants varies between 25 and 75% by weight.

In a preferred embodiment of the resin emulsion composition according to the present invention, the overall concentration of organic phase surfactants varies from 0.1 to 20%, preferably from 4 to 15%, and especially from 6 to 12% by weight.

In a preferred embodiment of the resin emulsion composition according to the present invention, the resins employed that contain active anionic sites can be neutralized with neutralizing agents to adjust the pH of the emulsion during or after the formation up to a suitable level, usually not strongly acidulated or alkaline, preferably present in the range from 0 to 150%, more preferably 40 to 110%, expressed as a percentage of the acid value of the resin.

In a preferred embodiment of the resin emulsion composition according to the present invention, others materials, for example, process additives, may be added in the aqueous phase or in the organic phase, prior to emulsification, to facilitate the emulsification process. Process additives include foam-inhibiting agents or foam eliminators, which when used will preferably be present in the range of 0.01 to 2% by mass of the emulsion; rheology modifiers, which when used, will preferably be present in the range of 0.5% to 20%, more preferably 0.5 to 10%, and especially 0.5 to 3% by weight of the emulsion; electrolytes which when used to control an inversion mechanism, will preferably be present in the range of 1 mmol·l$^{-1}$ to 100 mmol·l$^{-1}$ of emulsion.

In a preferred embodiment of the resin emulsion composition according to the present invention, the resin emulsions obtained contain stable droplets having average sizes less than 500 nm.

In a preferred embodiment of the resin emulsion composition according to the present invention, the process of obtaining the aqueous resin emulsions uses stirring speeds under 1500 rpm, conventional stirring systems and phase inversion emulsification method.

In a preferred embodiment of the resin emulsion composition according to the present invention, the resin emulsions obtained are employed in coating formulations applied in the construction industry, architectural paints, industrial paints, paints and varnishes for packaging in general.

The invention is illustrated by the non-limiting examples.

Example 1

200 g of alkyd resin (long in oil, based on soybean oil with a length of 60%) was added in a round-bottom flask partially immersed in a thermostatically-controlled bath at a temperature of 70° C. Once the temperature was stabilized, 4.0 g of KOH (solution at 45%) was added. Once completely dissolved, a composition of surfactants (22.0 g) according to the invention was added. Once fully dissolved in the water at the temperature of 70° C., it was slowly added, at a stirring speed of 230 rpm, until the point of inversion, determined as the point at which it is possible to disperse a sample of the emulsion in water. The solids content of the emulsion was determined at this time, the value of 75% being obtained. After this step, the remainder of the water to attain the solids content of 65% was added quickly. After this, the emulsion was cooled to ambient temperature.

Example 2

200 g of alkyd resin (long in oil, based on soybean oil with a length of 60%) diluted with turpentine solvent at 80% of solids was added in a round-bottom flask at ambient temperature. Thereafter, 4.0 g of KOH (solution at 45%) was added. Once fully dissolved, the composition of surfactants (13.0 g) according to the invention was added. Once fully dissolved, the water was slowly added at a stirring speed of 230 rpm, up until the point of inversion, determined as the point where it is possible to disperse a sample of the emulsion in water. The organic phase concentration at this time was 67% (by mass). After this step, the remainder of the water to attain the organic phase concentration of 65% by mass was added quickly.

RESULTS

The results are described in the following table:

|  | Example 1 | Example 2 |
| --- | --- | --- |
| Organic phase concentration | 65% | 65% |
| Viscosity (cPs) | 200 | 514 |
| Size of particle (nm; D50) | 220 | 207 |

The invention claimed is:

1. A resin emulsion composition, comprising at least a resin, water and at least a non-ionic surfactant of formula I:

$$R_1\text{-}(A_1O)_n\text{-}(A_2O)_x\text{-}(A_3O)_y\text{-}R_2 \quad (I)$$

wherein
$R_1$ is a saturated or unsaturated carbon chain containing 1-22 carbon atoms;
$A_1O$ is an alkylene oxide homopolymer or block or random copolymer;
$A_2O$ is an alkylene oxide block or random copolymer having a composition different than $A_1O$ and $A_3O$;
$A_3O$ is an alkylene oxide homopolymer or block or random copolymer;
x is an integer ranging from 1 to 30;
n is an integer ranging from 1 to 100;
y is an integer ranging from 0 to 100; and
$R_2$ is hydrogen or a saturated or unsaturated carbon chain containing 1-22 carbon atoms;
wherein said resin emulsion composition is obtained by a phase inversion emulsification process involving the inversion of phases in an organic phase concentration from 30 to 90%.

2. The resin emulsion composition as claimed in claim 1, wherein the resin is a polymer.

3. The resin emulsion composition as claimed in claim 1, wherein the resin is a single resin or mixture of two or more resins.

4. The resin emulsion composition as claimed in claim 1, wherein the resin is a long oil alkyd resin.

5. The resin emulsion composition as claimed in claim 1, wherein the resin comprises solvent-free resins, and/or resins in aromatic and aliphatic solvent solutions.

6. The resin emulsion composition as claimed in claim 1, wherein the $R_1$ saturated or unsaturated carbon chain is of vegetable or petrochemical origin.

7. The resin emulsion composition as claimed in claim 1, wherein the non-ionic surfactant is a mixture of a surfactant of formula I and conventional alkoxylate surfactants, wherein 10-100% of the mixture is a surfactant of formula I.

8. The resin emulsion composition as claimed in claim 1, further comprising at least one anionic surfactant.

9. The resin emulsion composition as claimed in claim 8, wherein at least the anionic surfactants are derived from alkyl ether carboxylates, alkyl aryl sulfonates, alkyl sulfonates, alkyl ether sulfates, phosphate esters, semi or diester sulfosuccinates, sulfated or sulfonated oils, or sulfonated fat, or alkyl or alkylene sulfates, any of which are neutralized with one or more alkaline metal bases.

10. The resin emulsion composition as claimed in claim 8, wherein the weight percentage of the non-ionic surfactant in the non-ionic/anionic surfactants composition ranges from 5 to 95%.

11. The resin emulsion composition as claimed in claim 1, wherein the concentration of organic phase surfactants ranges from 0.1 to 20%.

12. The resin emulsion composition as claimed in claim 1, wherein the resins containing anionic sites are neutralized with one or more alkaline metal bases, wherein the degree of neutralization of the anionic sites ranges from 0-150%.

13. The resin emulsion composition as claimed in claim 1, wherein the emulsion contains stable droplets having an average size of less than 500 nm.

14. A coating formulations comprising the resin emulsion composition as claimed in claim 1.

15. A process of obtaining the resin emulsion composition as claimed in claim 1, prepared by stirring the composition using conventional stirring systems at stirring speeds under 1500 rpm and using a phase inversion emulsification method.

16. The resin emulsion of claim 1, wherein organic phase concentration ranges from 60 to 80%.

17. The resin emulsion of claim 5, wherein the aromatic or aliphatic solvent solutions are esters, alcohols, glycols and derivatives thereof.

18. The resin emulsion of claim 9, wherein the alkaline metal bases are sodium and potassium, and amines.

19. The resin emulsion of claim 12, wherein the alkaline metal bases are sodium and potassium, and amines.

20. The formulation of claim 14, wherein the coating formulation is an architectural paint, an industrial paint, or a paint or varnish for packaging.

* * * * *